US012621395B2

(12) United States Patent
Wang et al.

(10) Patent No.: US 12,621,395 B2
(45) Date of Patent: May 5, 2026

(54) SCANNER WITH A FOLDABLE STAND

(71) Applicant: Foxlink Image Technology Co., Ltd., New Taipei City (TW)

(72) Inventors: Kuo Shing Wang, New Taipei City (TW); Hsing Hung Lee, New Taipei City (TW)

(73) Assignee: Foxlink Image Technology Co., Ltd., New Taipei City (TW)

( * ) Notice: Subject to any disclaimer, the term of this patent is extended or adjusted under 35 U.S.C. 154(b) by 272 days.

(21) Appl. No.: 18/645,376

(22) Filed: Apr. 25, 2024

(65) Prior Publication Data

US 2025/0106331 A1    Mar. 27, 2025

(30) Foreign Application Priority Data

Sep. 26, 2023    (CN) .......................... 202322631914.5

(51) Int. Cl.
*H04N 1/00*        (2006.01)
*F16M 11/10*        (2006.01)
(52) U.S. Cl.
CPC ......... *H04N 1/00535* (2013.01); *F16M 11/10* (2013.01)

(58) Field of Classification Search
CPC ........................... H04N 1/00535; F16M 11/10
USPC .......................................................... 358/474
See application file for complete search history.

(56) References Cited

FOREIGN PATENT DOCUMENTS

CN          203193753 U   *   9/2013
TW           M622130 U   *   1/2022   .............. B41J 29/06

* cited by examiner

*Primary Examiner* — Charlotte M Baker

(57)                ABSTRACT

A scanner with a foldable stand includes a housing, a first output tray foldably covered to an upper portion of a rear of the housing, a second output tray foldably covered to a top of the housing, a supporting stand and an abutting element. Two ends of the first output tray have a starting end, and a swingable connecting end connected to the starting end. An outer surface of the first output tray is recessed inward to form a holding groove. Two ends of the second output tray have a pivot end pivotally connected to the connecting end, and a swingable terminal end connected with a free end of the pivot end. The supporting stand is foldably fastened in the holding groove. The abutting element is formed at a middle of the connecting end. The abutting element contacts with an inner portion of the supporting stand.

13 Claims, 9 Drawing Sheets

100

100

100

100'

10'

20'

SCANNER WITH A FOLDABLE STAND

CROSS REFERENCE TO RELATED APPLICATIONS

The present application is based on, and claims priority from, China Patent Application No. 202322631914.5, filed Sep. 26, 2023, the disclosure of which is hereby incorporated by reference herein in its entirety.

BACKGROUND OF THE INVENTION

Field of the Invention

The present invention generally relates to a scanner with a foldable stand, and more particularly to a scanner with a foldable stand which is automatically unfolded with an opening of an output tray.

Description of Related Art

Referring to FIG. 9, in order to facilitate scanning a large quantity of documents by a user, a conventional automatic scanner 100' is equipped with an input tray for storing the documents which are to be fed, and an output tray 20' for loading the ejected documents. Simultaneously, in order to reduce a size of the conventional automatic scanner 100' and facilitate carrying the conventional automatic scanner 100', the input tray and the output tray 20' are often designed to be detachable or foldable.

Referring to FIG. 9, the conventional automatic scanner 100' includes a housing 10'. The output tray 20' is pivotally connected to a rear of the housing 10'. Therefore, the conventional automatic scanner 100' is able to feed the scanned documents to the output tray 20', and the scanned documents are temporarily stored to the output tray 20'.

However, when too many documents are piled up in the output tray 20', a centre of gravity of the conventional automatic scanner 100' easily tends to be shifted and tilted, so that it is necessary to provide a supporting stand for the conventional automatic scanner 100'.

In view of the above-mentioned problems, it is necessary to provide an innovative scanner with a foldable stand, in order to keep a size of the innovative scanner with the foldable stand light, thin and portable, the scanner with the foldable stand is automatically unfolded with an opening of an output tray.

BRIEF SUMMARY OF THE INVENTION

An object of the present invention is to provide a scanner with a foldable stand which is automatically unfolded with an opening of an output tray. The scanner with the foldable stand includes a housing, a first output tray foldably covered to an upper portion of a rear of the housing, a second output tray foldably covered to a top of the housing, a supporting stand and an abutting element. Two opposite ends of the first output tray have a starting end pivotally connected to the rear of the housing, and a swingable connecting end connected to a free end of the starting end, respectively. A middle of an outer surface of the first output tray is recessed inward to form a holding groove. Two opposite ends of the second output tray have a pivot end pivotally connected to a free end of the connecting end, and a swingable terminal end connected with a free end of the pivot end, respectively. The supporting stand is foldably fastened in the holding groove. Two opposite ends of the supporting stand have a fixing end pivoted to the second output tray, and a movable end which is swingable, respectively. A pivoting position between the fixing end and the second output tray is located at an outside of the pivot end. The abutting element is formed at a middle of the connecting end of the first output tray. The abutting element contacts with an inner portion of the supporting stand. When the first output tray is covered to the upper portion of the rear of the housing, and the second output tray is covered to the top of the housing, the supporting stand is fastened in the holding groove. When the first output tray and the second output tray are fully unfolded, the movable end of the supporting stand projects out of the holding groove.

Another object of the present invention is to provide a scanner with a foldable stand. The scanner with the foldable stand includes a housing, an output tray foldably covered to the housing, a supporting stand and an abutting element. The output tray includes a first output tray foldably covered to an upper portion of a rear of the housing, and a second output tray foldably covered to a top of the housing. Two opposite ends of the first output tray have a starting end pivotally connected to the rear of the housing, and a swingable connecting end connected to a free end of the starting end, respectively. A middle of an outer surface of the first output tray is recessed inward to form a holding groove. Two opposite ends of the second output tray have a pivot end pivotally connected to a free end of the connecting end, and a swingable terminal end connected with a free end of the pivot end, respectively. The supporting stand is foldably fastened in the holding groove. Two opposite ends of the supporting stand have a fixing end pivoted to the second output tray, and a movable end, respectively. The movable end is swingable with respect to the first output tray and the second output tray. A middle of an inner portion of the supporting stand which is adjacent to the fixing end is arched inward to form a convex portion. The abutting element is formed at a middle of the connecting end of the first output tray. The abutting element contacts with the inner portion of the supporting stand. An outside of a free end of the abutting element protrudes outward to form a protruding portion. When the first output tray is covered to the upper portion of the rear of the housing, and the second output tray is covered to the top of the housing, the supporting stand is fastened in the holding groove. When the first output tray and the second output tray are fully unfolded, the protruding portion fully abuts against a middle of an inner surface of the convex portion, the movable end of the supporting stand projects out of the holding groove.

Another object of the present invention is to provide a scanner with a foldable stand. The scanner with the foldable stand includes a housing, a first output tray, a second output tray, a supporting stand and an abutting element. The first output tray is foldably covered to an upper portion of a rear of the housing. Two opposite ends of the first output tray have a starting end pivotally connected to the rear of the housing, and a swingable connecting end connected to a free end of the starting end, respectively. A middle of an outer surface of the first output tray is recessed inward to form a holding groove. The second output tray is foldably covered to a top of the housing. Two opposite ends of the second output tray have a pivot end pivotally connected to a free end of the connecting end, and a swingable terminal end connected with a free end of the pivot end, respectively. The supporting stand is foldably fastened in the holding groove. Two opposite ends of the supporting stand have a fixing end pivoted to the second output tray, and a movable end, respectively. The movable end is swingable with respect to the first output tray and the second output tray. A middle of an inner portion of the supporting stand which is adjacent to the fixing end is arched inward to form a convex portion. A portion of an inner surface of the convex portion which is away from the fixing end slantwise extends outward and towards the movable end to form a contacting surface. The abutting element is formed at a middle of the connecting end of the first output tray. The abutting element contacts with the inner portion of the supporting stand. An outside of a free end of the abutting element protrudes outward to form a protruding portion. A free end of an outer surface of the protruding portion slantwise extends outward and towards a middle of the free end of the connecting end to form a buckling surface. When the first output tray is covered to the upper portion of the rear of the housing, and the second output tray is covered to the top of the housing, the buckling surface abuts against the contacting surface, the supporting stand is fastened in the holding groove. When the first output tray and the second output tray are fully unfolded, the protruding portion fully abuts against a middle of the inner surface of the convex portion, the movable end of the supporting stand projects out of the holding groove.

As described above, the scanner with the foldable stand includes the housing, the first output tray, the second output tray, the supporting stand and the abutting element, the two opposite ends of the first output tray have the starting end pivotally connected to the rear of the housing, and the swingable connecting end connected to the free end of the starting end, the two opposite ends of the second output tray have the pivot end pivotally connected to the free end of the connecting end, and the swingable terminal end connected with the free end of the pivot end, the two opposite ends of the supporting stand have the fixing end pivoted to the second output tray, and the movable end which is swingable, the pivoting position between the fixing end and the second output tray is located at the outside of the pivot end, the abutting element is formed at the middle of the connecting end of the first output tray, and the abutting element contacts with the inner portion of the supporting stand, so that the scanner with the foldable stand is achieved to be provided, and the scanner with the foldable stand is automatically unfolded with an opening of the output tray.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
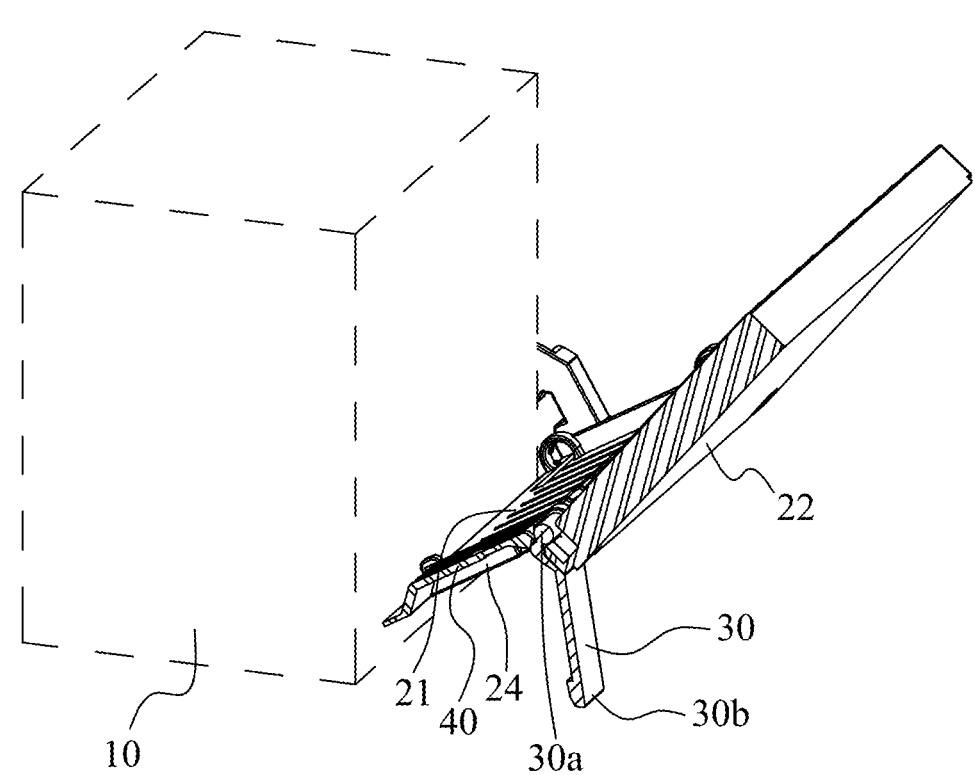
FIG. 1 is a cross-sectional view of a scanner with a foldable stand in accordance with a preferred embodiment of the present invention.
Figure 2:
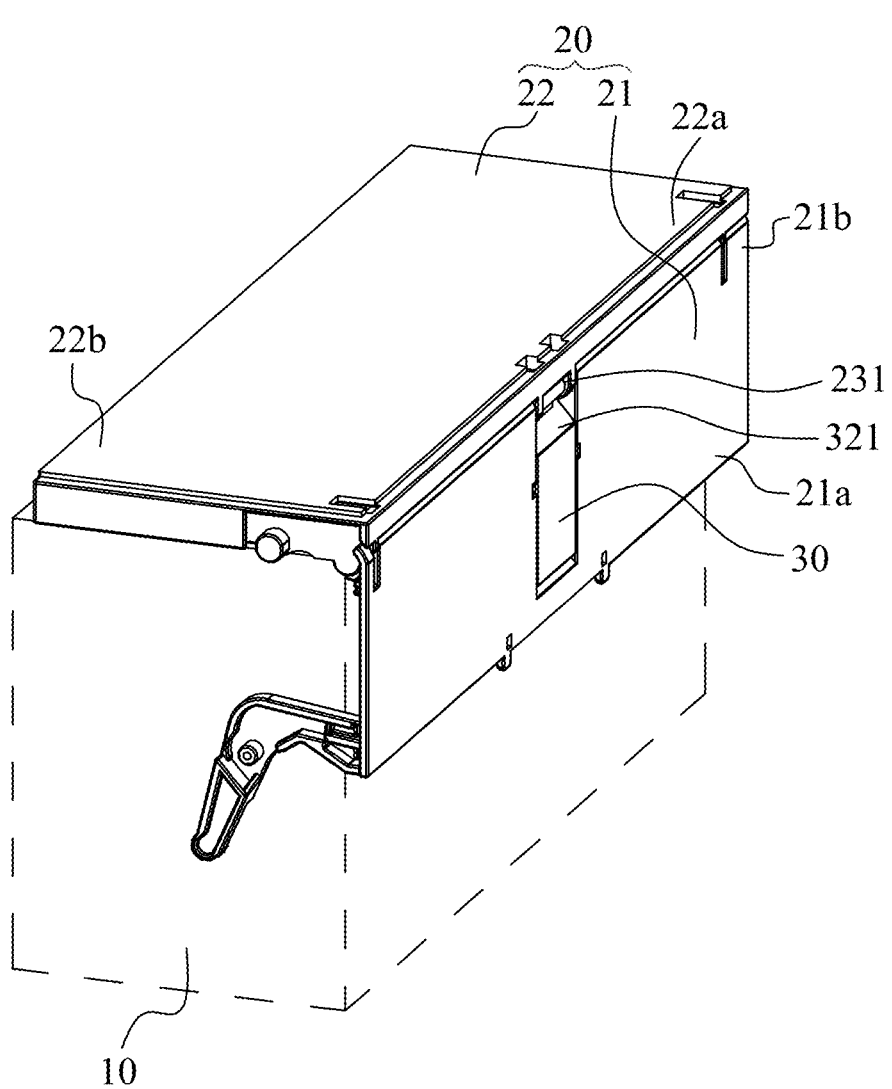
FIG. 2 is a perspective view of the scanner with the foldable stand, wherein the scanner with the foldable stand is in a folded status according to the preferred embodiment of the present invention.
Figure 3:
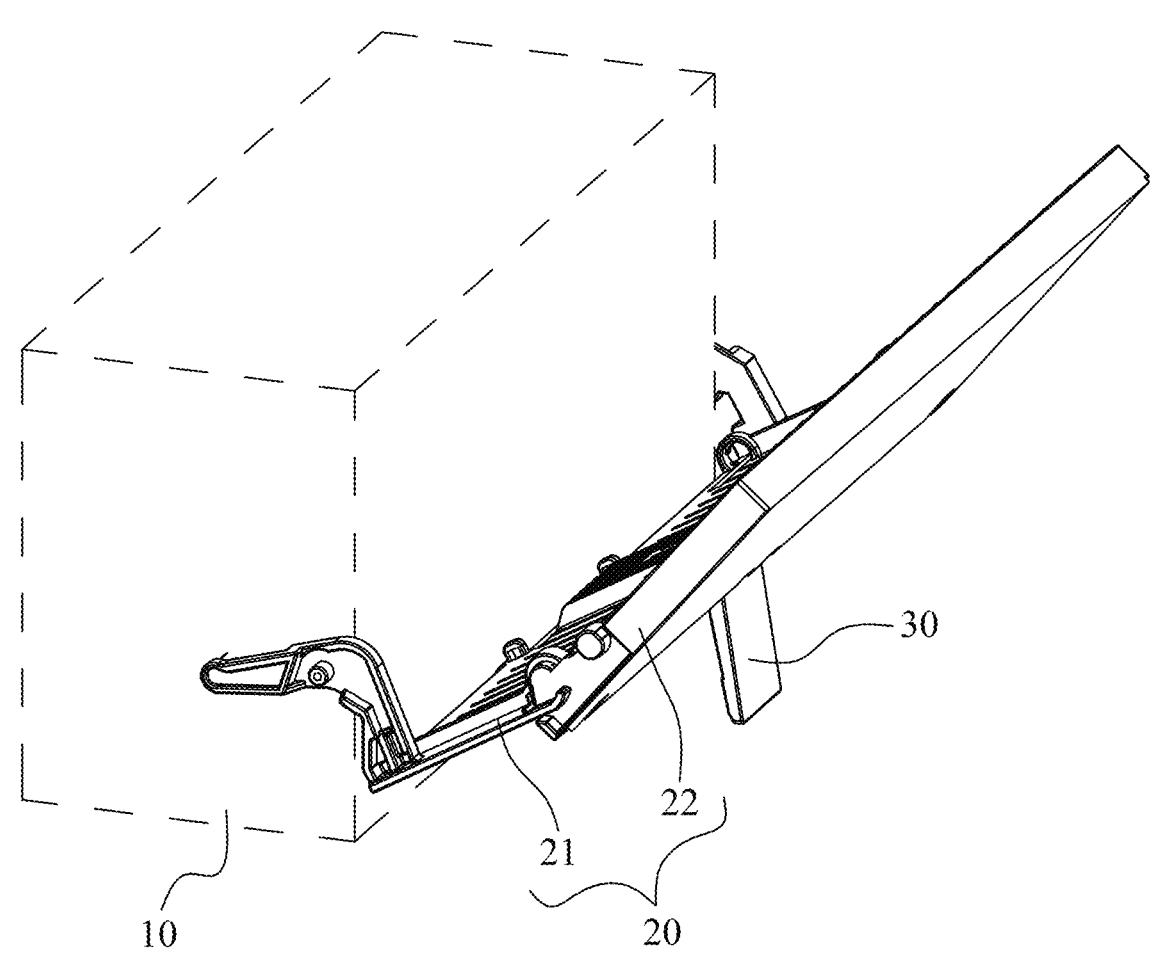
FIG. 3 is a perspective view of the scanner with the foldable stand, wherein the scanner with the foldable stand is in an unfolded status according to the preferred embodiment of the present invention.
Figure 4:
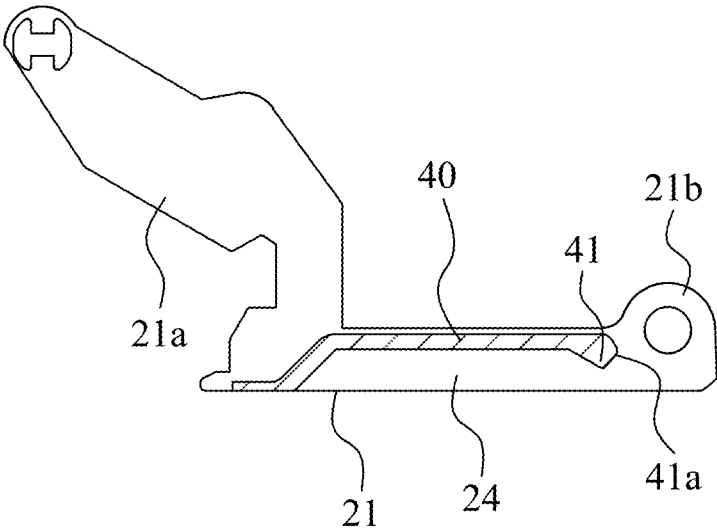
FIG. 4 is a cross-sectional view of a first output tray and an abutting element of the scanner with the foldable stand according to the preferred embodiment of the present invention.
Figure 5:
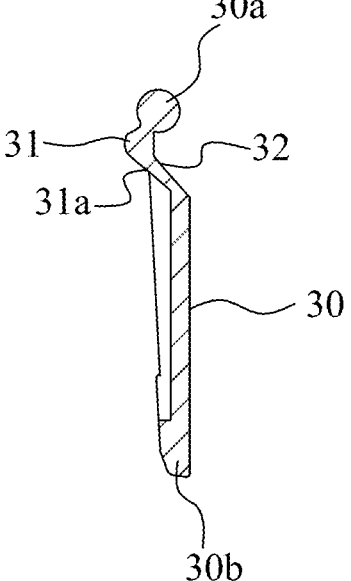
FIG. 5 is a cross-sectional view of a supporting stand of the scanner with the foldable stand according to the preferred embodiment of the present invention.
Figure 6:
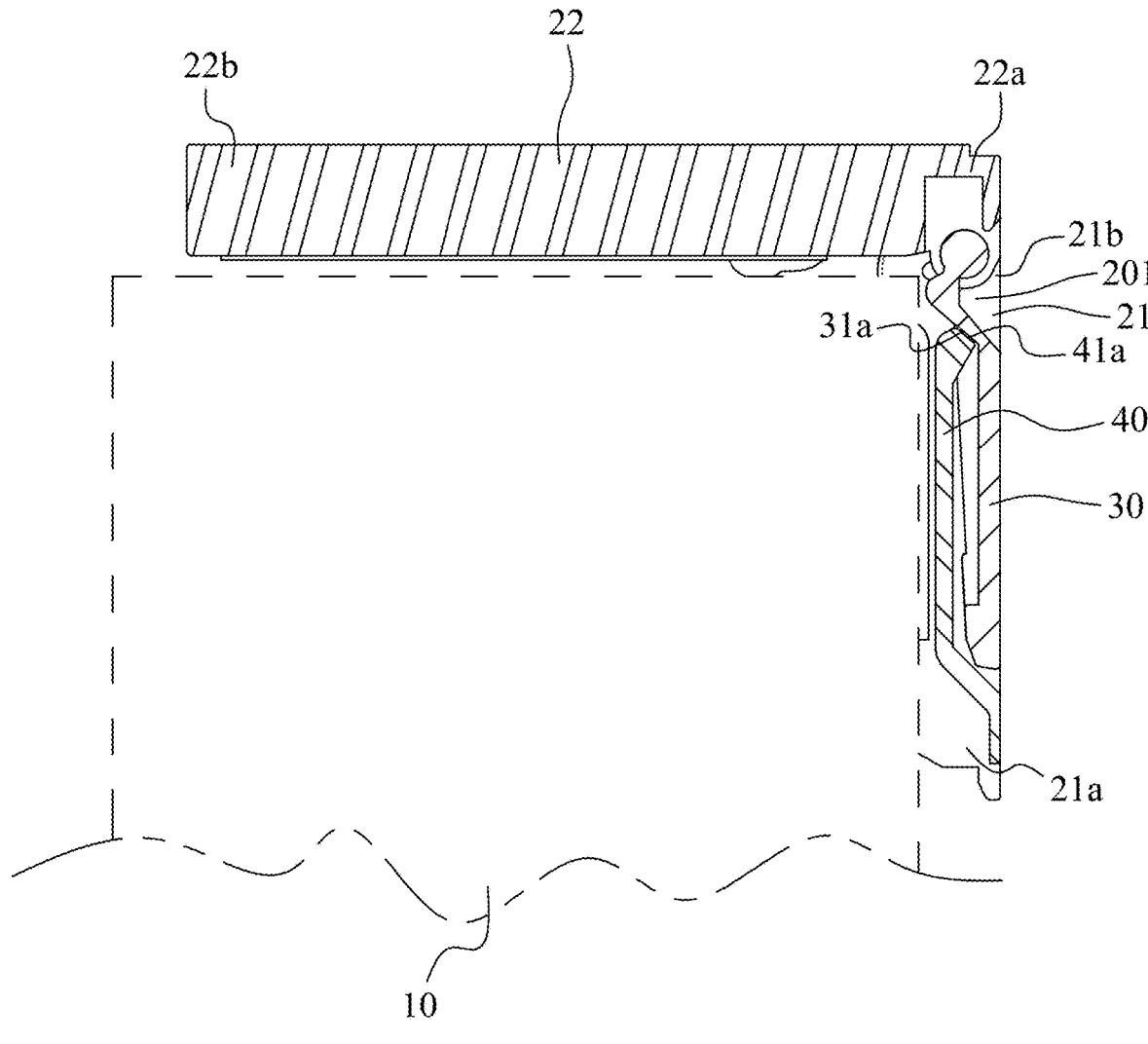
FIG. 6 is a cross-sectional view of the scanner with the foldable stand, wherein the scanner with the foldable stand is in the folded status according to the preferred embodiment of the present invention.
Figure 7:
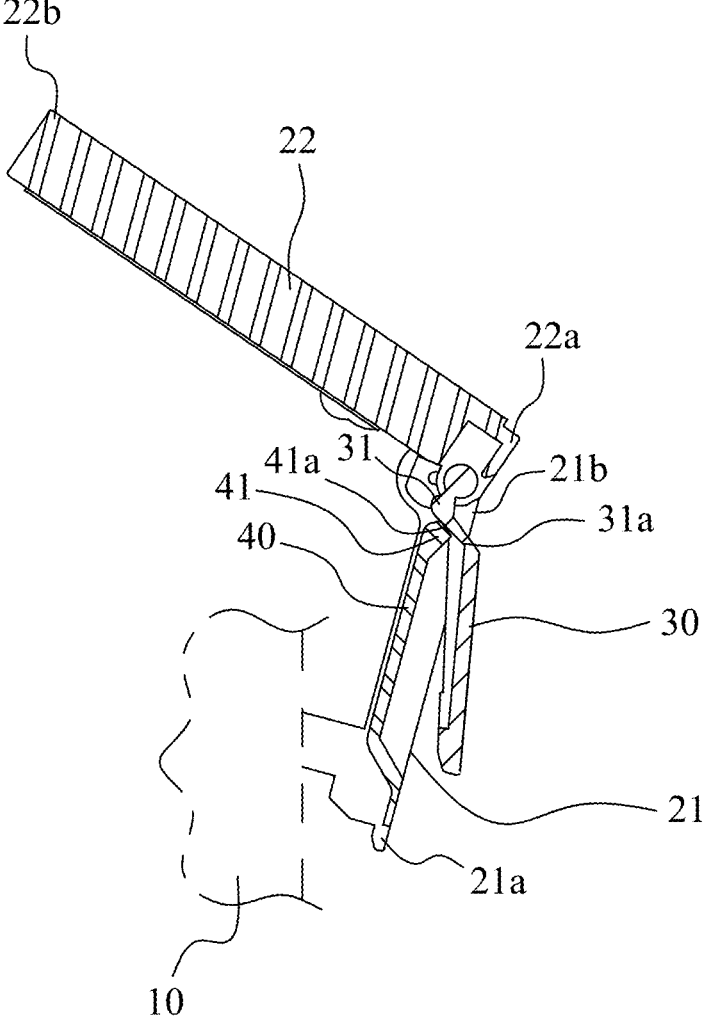
FIG. 7 is a cross-sectional view of the scanner with the foldable stand, wherein the scanner with the foldable stand is in an unfolding process according to the preferred embodiment of the present invention.
Figure 8:
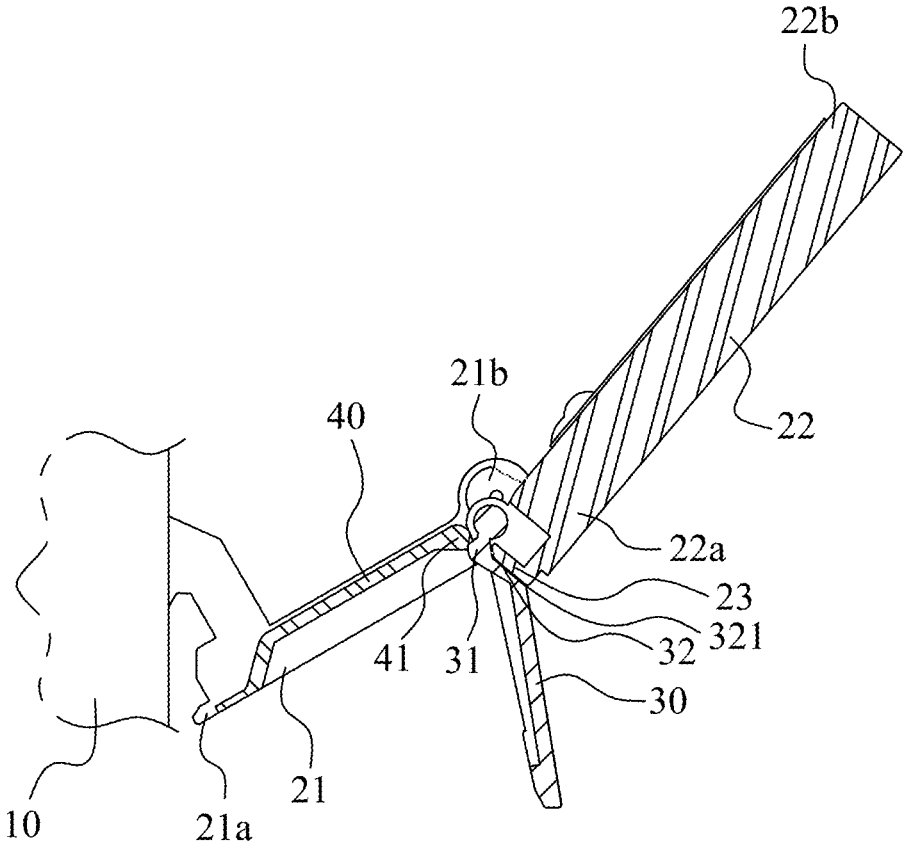
FIG. 8 is a cross-sectional view of the scanner with the foldable stand, wherein the scanner with the foldable stand is in the unfolded status according to the preferred embodiment of the present invention.
Figure 9:
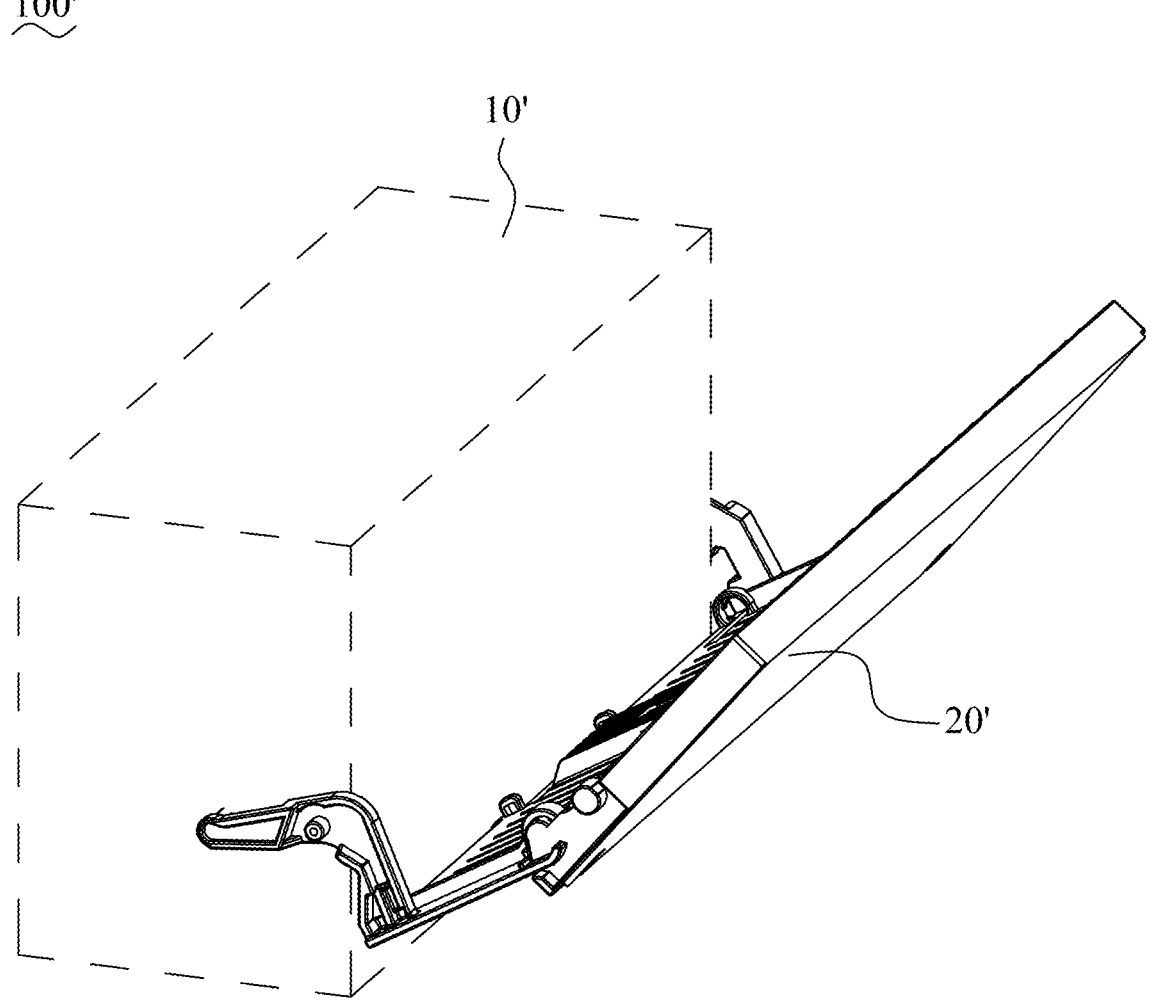
FIG. 9 is a perspective view of a conventional automatic scanner in prior art.

Referring to FIG. 1 to FIG. 3, a scanner with a foldable stand 100 in accordance with a preferred embodiment of the present invention is shown. The scanner with the foldable stand 100 is adapted for scanning documents (not shown). The scanner with the foldable stand 100 includes a housing 10, an output tray 20 for loading the documents, a supporting stand 30 and an abutting element 40. The output tray 20 is foldably covered to the housing 10. The output tray 20 includes a first output tray 21 and a second output tray 22 which are foldable.

In order to describe conveniently, directions of the output tray 20 and directions of the scanner with the foldable stand 100 are defined in the same way. The directions of the output tray 20 of the scanner with the foldable stand 100 are defined as follows. In this description, when the first output tray 21 and the second output tray 22 of the output tray 20 are unfolded, a surface of the first output tray 21 which contacts with the documents is defined as an inner surface of the first output tray 21, and a surface of the second output tray 22 which contacts with the documents is defined as an inner surface of the second output tray 22. The scanner with the foldable stand 100 is positioned on a table (not shown). A surface of the first output tray 21 which is towards a top surface of the table is defined as an outer surface of the first output tray 21. A surface of the second output tray 22 which is towards the top surface of the table is defined as an outer surface of the second output tray 22. The outer surface of the first output tray 21 is opposite to the inner surface of the first output tray 21. The outer surface of the second output tray 22 is opposite to the inner surface of the second output tray 22.

When the first output tray 21 and the second output tray 22 of the output tray 20 are folded to the housing 10, a surface of the first output tray 21 which contacts with the housing 10 is defined as the inner surface of the first output tray 21, and a surface of the second output tray 22 which contacts with the housing 10 is defined as the inner surface of the second output tray 22. A surface of the first output tray 21 which is towards an outside of the scanner with the foldable stand 100 is defined as the outer surface of the first output tray 21. A surface of the second output tray 22 which is towards the outside of the scanner with the foldable stand 100 is defined as the outer surface of the second output tray 22.

Two opposite ends of the first output tray 21 have a starting end 21a pivotally connected to a rear of the housing 10, and a swingable connecting end 21b connected to a free end of the starting end 21a, respectively. Two opposite ends of the second output tray 22 have a pivot end 22a pivotally connected to a free end of the connecting end 21*b*, and a swingable terminal end 22*b* connected with a free end of the pivot end 22*a*, respectively. The starting end 21*a* is pivoted to the rear of the housing 10 to bring along the connecting end 21*b* to freely swing towards the housing 10 or away from the housing 10. The pivot end 22*a* is pivoted to the free end of the connecting end 21*b* to bring along the terminal end 22*b* to freely swing towards the housing 10 or away from the housing 10.

The first output tray 21 is foldably covered to an upper portion of the rear of the housing 10. The second output tray 22 is pivotally connected to a free end of the first output tray 21. The second output tray 22 is foldably covered to a top of the housing 10. When the scanner with the foldable stand 100 starts scanning, the first output tray 21 and the second output tray 22 are unfolded to form the output tray 20. The output tray 20 is located behind the housing 10 for loading the documents (not shown).

Referring to FIG. 1 to FIG. 6, in order to enable the scanner with the foldable stand 100 to stand stably, the supporting stand 30 is foldably fastened to an outer surface of the output tray 20, specifically, the supporting stand 30 is foldably fastened to the outer surfaces of the first output tray 21 and the second output tray 22, the two opposite ends of the supporting stand 30 have a fixing end 30*a* pivoted to the second output tray 22, and a movable end 30*b* which is swingable, respectively. The movable end 30*b* is swingable with respect to the first output tray 21 and the second output tray 22. The fixing end 30*a* of the supporting stand 30 is pivotally connected to a middle of an outer portion of the pivot end 22*a* of the second output tray 22. The abutting element 40 is formed at a middle of the connecting end 21*b* of the first output tray 21. The abutting element 40 is an elastic arm. The abutting element 40 is separated from two sides of the connecting end 21*b* of the first output tray 21. When the first output tray 21 and the second output tray 22 are folded to the housing 10, the abutting element 40 is without contacting the supporting stand 30, and the movable end 30*b* is attached to a middle of the outer surface of the first output tray 21. When the first output tray 21 and the second output tray 22 are unfolded, the fixing end 30*a* of the supporting stand 30 is driven by the pivot end 22*a* of the second output tray 22 to move towards the abutting element 40, and the abutting element 40 is driven by the first output tray 21 to move towards the supporting stand 30, so the abutting element 40 contacts with an inner portion of the supporting stand 30, so the supporting stand 30 is pushed by the abutting element 40 to be opened outward.

Referring to FIG. 1 to FIG. 5, in the preferred embodiment, the middle of the outer surface of the first output tray 21 is recessed inward to form a holding groove 24. The supporting stand 30 is foldably fastened in the holding groove 24. When the first output tray 21 is covered to the upper portion of the rear of the housing 10, and the second output tray 22 is covered to the top of the housing 10, the first output tray 21 and the second output tray 22 are in a folded status. When the first output tray 21 and the second output tray 22 are unfolded, and the first output tray 21 and the second output tray 22 move away from the housing 10, the first output tray 21 and the second output tray 22 are in an unfolded status. When the first output tray 21 is covered to the upper portion of the rear of the housing 10, and the second output tray 22 is covered to the top of the housing 10, namely, when the first output tray 21 and the second output tray 22 are in the folded status, the supporting stand 30 is received in the holding groove 24.

Referring to FIG. 1 to FIG. 6, in order to make the supporting stand 30 more stable, an outside of a free end of the abutting element 40 protrudes outward to form a protruding portion 41. The protruding portion 41 projects into the holding groove 24. The protruding portion 41 abuts against the supporting stand 30. The protruding portion 41 pushes against the supporting stand 30. A free end of an outer surface of the protruding portion 41 slantwise extends outward and towards a middle of a free end of the connecting end 21*b* to form a buckling surface 41*a*. The middle of the free end of the connecting end 21*b* is recessed towards the protruding portion 41 to form an accommodating space 201. A middle of the pivot end 22*a* projects into the accommodating space 201. The accommodating space 201 extends to the holding groove 24, and the accommodating space 201 is communicated with the holding groove 24. One end of the supporting stand 30 projects into the accommodating space 201.

In the meanwhile, a middle of the inner portion of the supporting stand 30 which is adjacent to the fixing end 30*a* is arched inward to form a convex portion 31. The protruding portion 41 of the abutting element 40 pushes against the convex portion 31 of the supporting stand 30. A portion of an inner surface of the convex portion 31 which is away from the fixing end 30*a* slantwise extends outward and towards the movable end 30*b* to form a contacting surface 31*a*. A middle of an outer end of the second output tray 22 which is adjacent to the pivot end 22*a* protrudes towards the middle of the free end of the connecting end 21*b* to form a positioning block 23. A middle of the positioning block 23 defines a locating groove 231 penetrating through a free end of the positioning block 23. An outer surface of the one end of the supporting stand 30 which projects into the accommodating space 201 is recessed inward to form a positioning groove 32. The positioning groove 32 faces towards the fixing end 30*a*. An outer surface of a wall of the positioning groove 32 of the supporting stand 30 which is away from the fixing end 30*a* slantwise extends outward and towards the movable end 30*b* to form a positioning surface 321. Two sides of the positioning surface 321 extend to two sides of the fixing end 30*a*. The positioning block 23 is positioned in the positioning groove 32. The fixing end 30*a* is located in the locating groove 231. The fixing end 30*a* of the supporting stand 30 abuts against two facing inner surfaces of two side walls of the locating groove 231. A pivoting position between the fixing end 30*a* and the second output tray 22 is located at an outside of the pivot end 22*a*.

Referring to FIG. 1 to FIG. 6, when the first output tray 21 is covered to the upper portion of the rear of the housing 10, and the second output tray 22 is covered to the top of the housing 10, the buckling surface 41*a* abuts against the contacting surface 31*a*, so the supporting stand 30 is fastened in the holding groove 24.

Referring to FIG. 1 to FIG. 7, when the first output tray 21 and the second output tray 22 are unfolding, a middle of the inner surface of the convex portion 31 moves closer to the protruding portion 41 to disengage the buckling surface 41*a* from the contacting surface 31*a*, the middle of the inner surface of the convex portion 31 is shown as an arc shape, and simultaneously, the protruding portion 41 pushes the convex portion 31 to move outward.

Referring to FIG. 1 to FIG. 8, when the first output tray 21 and the second output tray 22 are fully unfolded, the positioning block 23 is buckled into the positioning groove 32, an outer surface of the positioning block 23 abuts against the positioning surface 321, and the buckling surface 41*a* of the protruding portion 41 fully abuts against the middle of the inner surface of the convex portion 31, so that the supporting stand 30 is fastened from an inside of the supporting stand 30 and an outside of the supporting stand 30, respectively. The movable end 30*b* of the supporting stand 30 projects out of the holding groove 24.

As described above, the scanner with the foldable stand 100 includes the housing 10, the first output tray 21, the second output tray 22, the supporting stand 30 and the abutting element 40, the two opposite ends of the first output tray 21 have the starting end 21*a* pivotally connected to the rear of the housing 10, and the swingable connecting end 21*b* connected to the free end of the starting end 21*a*, the two opposite ends of the second output tray 22 have the pivot end 22*a* pivotally connected to the free end of the connecting end 21*b*, and the swingable terminal end 22*b* connected with the free end of the pivot end 22*a*, the two opposite ends of the supporting stand 30 have the fixing end 30*a* pivoted to the second output tray 22, and the movable end 30*b* which is swingable, the pivoting position between the fixing end 30*a* and the second output tray 22 is located at the outside of the pivot end 22*a*, the abutting element 40 is formed at the middle of the connecting end 21*b* of the first output tray 21, and the abutting element 40 contacts with the inner portion of the supporting stand 30, so that the scanner with the foldable stand 100 is achieved to be provided, and the scanner with the foldable stand 100 is automatically unfolded with an opening of the output tray 20.

What is claimed is:

1. A scanner with a foldable stand, comprising:

a housing;

a first output tray foldably covered to an upper portion of a rear of the housing, two opposite ends of the first output tray having a starting end pivotally connected to the rear of the housing, and a swingable connecting end connected to a free end of the starting end, respectively, a middle of an outer surface of the first output tray being recessed inward to form a holding groove;

a second output tray foldably covered to a top of the housing, two opposite ends of the second output tray having a pivot end pivotally connected to a free end of the connecting end, and a swingable terminal end connected with a free end of the pivot end, respectively;

a supporting stand foldably fastened in the holding groove, two opposite ends of the supporting stand having a fixing end pivoted to the second output tray, and a movable end which is swingable, respectively, a pivoting position between the fixing end and the second output tray being located at an outside of the pivot end; and an abutting element formed at a middle of the connecting end of the first output tray, the abutting element contacting with an inner portion of the supporting stand, wherein when the first output tray is covered to the upper portion of the rear of the housing, and the second output tray is covered to the top of the housing, the supporting stand is fastened in the holding groove, and wherein when the first output tray and the second output tray are fully unfolded, the movable end of the supporting stand projects out of the holding groove.

2. The scanner with the foldable stand as claimed in claim 1, wherein a middle of an outer surface of the first output tray is recessed inward to form a holding groove, when the first output tray is covered to the upper portion of the rear of the housing, and the second output tray is covered to the top of the housing, the supporting stand is received in the holding groove.

3. The scanner with the foldable stand as claimed in claim 2, wherein an outside of a free end of the abutting element protrudes outward to form a protruding portion, the protruding portion pushes against the supporting stand.

4. The scanner with the foldable stand as claimed in claim 3, wherein a middle of the inner portion of the supporting stand which is adjacent to the fixing end is arched inward to form a convex portion, the protruding portion of the abutting element pushes against the convex portion.

5. The scanner with the foldable stand as claimed in claim 4, wherein a free end of an outer surface of the protruding portion slantwise extends outward and towards a middle of the free end of the connecting end to form a buckling surface, a portion of an inner surface of the convex portion which is away from the fixing end slantwise extends outward and towards the movable end to form a contacting surface, when the first output tray is covered to the upper portion of the rear of the housing, and the second output tray is covered to the top of the housing, the buckling surface abuts against the contacting surface.

6. The scanner with the foldable stand as claimed in claim 5, wherein when the first output tray and the second output tray are fully unfolded, the buckling surface of the protruding portion fully abuts against a middle of the inner surface of the convex portion.

7. The scanner with the foldable stand as claimed in claim 3, wherein a middle of the free end of the connecting end is recessed towards the protruding portion to form an accommodating space, a middle of the pivot end projects into the accommodating space, the accommodating space extends to the holding groove, and the accommodating space is communicated with the holding groove, one end of the supporting stand projects into the accommodating space.

8. The scanner with the foldable stand as claimed in claim 7, wherein a middle of an outer end of the second output tray which is adjacent to the pivot end protrudes towards the middle of the free end of the connecting end to form a positioning block, an outer surface of the one end of the supporting stand which projects into the accommodating space is recessed inward to form a positioning groove, the positioning groove faces towards the fixing end, the positioning block is positioned in the positioning groove.

9. The scanner with the foldable stand as claimed in claim 8, wherein a middle of the positioning block defines a locating groove penetrating through a free end of the positioning block, the fixing end is located in the locating groove, the fixing end of the supporting stand abuts against two facing inner surfaces of two side walls of the locating groove.

10. The scanner with the foldable stand as claimed in claim 9, wherein an outer surface of a wall of the positioning groove which is away from the fixing end slantwise extends outward and towards the movable end to form a positioning surface, two sides of the positioning surface extend to two sides of the fixing end, when the first output tray and the second output tray are fully unfolded, the positioning block is buckled into the positioning groove, an outer surface of the positioning block abuts against the positioning surface.

11. The scanner with the foldable stand as claimed in claim 1, wherein the abutting element is an elastic arm.

12. A scanner with a foldable stand, comprising:

a housing;

an output tray foldably covered to the housing, including a first output tray foldably covered to an upper portion of a rear of the housing, two opposite ends of the first output tray having a starting end pivotally connected to the rear of the housing, and a swingable connecting end connected to a free end of the starting end, respectively, a middle of an outer surface of the first output tray being recessed inward to form a holding groove, and a second output tray foldably covered to a top of the housing, two opposite ends of the second output tray having a pivot end pivotally connected to a free end of the connecting end, and a swingable terminal end connected with a free end of the pivot end, respectively;

a supporting stand foldably fastened in the holding groove, two opposite ends of the supporting stand having a fixing end pivoted to the second output tray, and a movable end, respectively, the movable end being swingable with respect to the first output tray and the second output tray, a middle of an inner portion of the supporting stand which is adjacent to the fixing end being arched inward to form a convex portion; and an abutting element formed at a middle of the connecting end of the first output tray, the abutting element contacting with the inner portion of the supporting stand, an outside of a free end of the abutting element protruding outward to form a protruding portion, wherein when the first output tray is covered to the upper portion of the rear of the housing, and the second output tray is covered to the top of the housing, the supporting stand is fastened in the holding groove, and wherein when the first output tray and the second output tray are fully unfolded, the protruding portion fully abuts against a middle of an inner surface of the convex portion, the movable end of the supporting stand projects out of the holding groove.

13. A scanner with a foldable stand, comprising:

a housing;

a first output tray foldably covered to an upper portion of a rear of the housing, two opposite ends of the first output tray having a starting end pivotally connected to the rear of the housing, and a swingable connecting end connected to a free end of the starting end, respectively, a middle of an outer surface of the first output tray being recessed inward to form a holding groove;

a second output tray foldably covered to a top of the housing, two opposite ends of the second output tray having a pivot end pivotally connected to a free end of the connecting end, and a swingable terminal end connected with a free end of the pivot end, respectively;

a supporting stand foldably fastened in the holding groove, two opposite ends of the supporting stand having a fixing end pivoted to the second output tray, and a movable end, respectively, the movable end being swingable with respect to the first output tray and the second output tray, a middle of an inner portion of the supporting stand which is adjacent to the fixing end being arched inward to form a convex portion, a portion of an inner surface of the convex portion which is away from the fixing end slantwise extending outward and towards the movable end to form a contacting surface; and an abutting element formed at a middle of the connecting end of the first output tray, the abutting element contacting with the inner portion of the supporting stand, an outside of a free end of the abutting element protruding outward to form a protruding portion, a free end of an outer surface of the protruding portion slantwise extending outward and towards a middle of the free end of the connecting end to form a buckling surface, wherein when the first output tray is covered to the upper portion of the rear of the housing, and the second output tray is covered to the top of the housing, the buckling surface abuts against the contacting surface, the supporting stand is fastened in the holding groove, and wherein when the first output tray and the second output tray are fully unfolded, the protruding portion fully abuts against a middle of the inner surface of the convex portion, the movable end of the supporting stand projects out of the holding groove.

* * * * *